(No Model.)
G. H. GREGORY.
APPARATUS FOR MANUFACTURING GAS.
No. 572,795.
Patented Dec. 8, 1896.
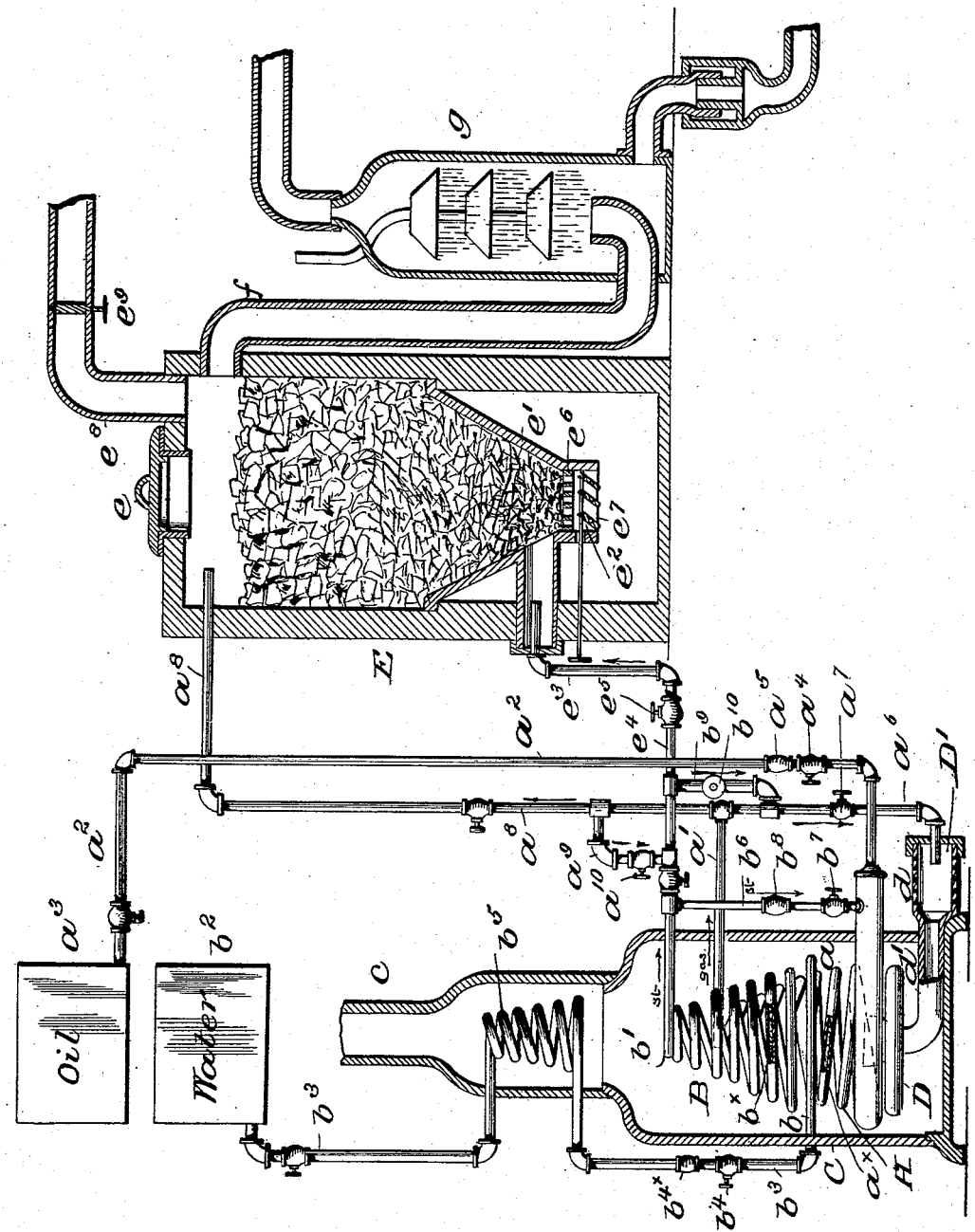
Witnesses
Inventor
George H. Gregory.
By Crosby & Gregory
his Attorneys

UNITED STATES PATENT OFFICE.

GEORGE H. GREGORY, OF SOMERVILLE, MASSACHUSETTS.

APPARATUS FOR MANUFACTURING GAS.

SPECIFICATION forming part of Letters Patent No. 572,795, dated December 8, 1896.

Application filed October 11, 1893. Serial No. 487,874. (No model.)

*To all whom it may concern:*

Be it known that I, GEORGE H. GREGORY, of Somerville, county of Middlesex, State of Massachusetts, have invented an Improvement in Apparatus for the Manufacture of Gas, of which the following description, in connection with the accompanying drawing, is a specification, like letters on the drawing representing like parts.

This invention in the manufacture of gas from a liquid hydrocarbon has for its principal object the production of a gas of high illuminating and heating power at a much reduced cost of manufacture.

In accordance with one part of this invention I generate the gas within a conduit wholly or partially filled with an irregular or broken refractory substance, the use of said conduit enabling me to generate the gas from the heat supplied by a gas-burner of such size that it may be easily supplied with gas tapped off from the main supply generated without seriously lessening the efficiency of the apparatus, thereby making the latter practically an automatic or self-operating apparatus capable of running for a considerable time.

The invention comprehends other important features, which will be hereinafter described, and pointed out in the claims.

The drawing represents, in vertical section, one form of apparatus by which to manufacture gas in accordance with this invention.

Referring to the drawing, in the embodiment of my invention there shown A represents an oil or gas conduit, preferably in the form of a coil, having its inlet at $a$ and its outlet at $a'$, the said conduit being shown as filled, more or less, with a non-combustible heat-conducting material $a^\times$, such, for instance, as metallic lathe-turnings, broken brick, &c., the said conduit with its contents being heated externally by means of a suitable heat-generator. The inlet $a$ of the conduit is connected by a supply-pipe $a^2$ with an oil-supply receptacle $a^3$, the said pipe containing a controlling-valve $a^4$ and a check-valve $a^5$, the latter preventing a return of the oil or any other fluid from the conduit to the said receptacle.

B represents a water-conduit, also preferably in the form of a coil, arranged over and about the conduit A and having its inlet at $b$ and its outlet at $b'$, said water-conduit being, more or less, filled with a non-combustible heat-conducting material $b^\times$, like the conduit A described.

A water-supply receptacle $b^2$ is connected by a pipe $b^3$ with the inlet $b$ of the water-conduit, said pipe being controlled by a suitable valve, as $b^4$, and a check-valve $b^{4\times}$ to prevent the steam generated from backing up. The water in its passage from the receptacle $b^2$ to the conduit B is preferably passed through a preliminary heater, shown as a coil $b^5$, interposed in the pipe $b^3$ and located in the outlet or smoke funnel $c$ of the heat-generator.

Both conduits A and B are shown as arranged within a suitable jacket C, having its outlet through a suitable funnel $c$.

The heat-generator shown and which I prefer to use is shown at D, the same being any suitable gas or vapor burner.

The burner D is herein supplied with gas from the conduit A through a pipe $a^6$, leading from the outlet end $a'$ of the said conduit, the said pipe $a^6$, before connecting with the burner, passing through a suitable air and gas mixing device D', which may be of any suitable construction and in which a certain quantity of air, more or less, is mixed with the gas before the latter passes to the burner.

As herein shown, the mixing device is simple, and consists of a perforated shell $d$, into one end of which the pipe $a^6$ from the conduit A enters, and from the opposite end of which a pipe $d'$ leads to conduct the gas to the burner.

It will be noticed that the flaring entrance to the pipe $d'$ stands a short distance beyond or in front of the end of the pipe $a^6$, so that the gas from the conduit A in shooting across from the said pipe $a^6$ into the flaring end of the pipe $d'$ on its way to the burner draws with it into the said pipe more or less air, according to the pressure with which the gas issues from the delivery-pipe $a^6$ and the natural draft through the burner.

A valve $a^7$ in the pipe $a^6$ furnishes means by which to accurately regulate the quantity of gas admitted to the burner.

E is a cupola to contain a quantity of carbon, preferably in the form of coal, the same being deposited in the cupola through a suitable feed-opening at the top normally closed by a door $e$. The cupola, as shown, is provided with a cone-shaped bottom $e'$, having a central opening $e^2$, across which is arranged a grate $e^6$, furnished with a register $e^7$, by which to close its openings. A branch $a^8$ leads from the outlet end $a'$ of the conduit A to and enters the cupola E, preferably near its top, as shown, the said branch $a^8$ having yet another short branch or connection $a^9$ leading to the steam-pipe $a^4$, said connection being controlled by a valve $a^{10}$. The outlet $b'$ of the water-conduit B is also connected by a pipe $b^6$ with the inlet $a$ of the oil-conduit A, the said pipe $b^6$ containing a regulating-valve $b^7$ and a check-valve $b^8$, the latter preventing a rearward and upward flow through the said pipe.

The pipe $e^4$, leading from the steam-conduit, is shown connected by a branch $b^9$ with the pipe $a^6$, leading from the gas-conduit to the mixing-chamber D', said connecting-pipe $b^9$ being provided with a controlling-valve $b^{10}$, whereby more or less superheated steam may be admitted to the gas-pipe $a^6$, to thereby mix the gas with more or less steam before passing to the burner.

The operation of my improved apparatus for the manufacture of gas is as follows, viz: The conduits A and B are first heated, as by kindling a wood fire within the jacket C or in any other convenient manner. When the conduits have become thoroughly heated or sufficiently so to vaporize oil and water therein, the valve $a^4$ may be opened to permit oil from the tank $a^3$ to flow through the conduit A, the oil thus permitted to flow through being divided into small quantities by the non-combustible heat-conducting material therein and in its divided condition brought in contact with the large heating-surface presented by the said non-combustible heat-conducting material and thereby quickly raised to such a temperature that it assumes a gaseous condition, the gas or vapor thus formed being further raised to an extremely high temperature or superheated by its further and continuous passage through said conduit. A portion of the gas thus generated is conducted through the branch $a^6$ to the burner D to support a flame thereat, said burner being thereafter alone sufficient to maintain the requisite heat and the continued operation of the apparatus. The gas passing to the burner D is more or less mixed with air in passing through the mixing device, its heating power being thereafter greatly increased. Such portion of the gas as is not thus returned to the burner for maintaining the conduits in a highly-heated condition is shown conducted through the pipe $a^8$ to the top of the cupola E, or it may be conducted to other receptacles, if desired.

Returning now to the conduit B, preferably at or about the same time that the oil from the receptacle $a^3$ is permitted to flow through the conduit A the valve $b^4$ in the pipe $b^3$ is opened and water from the said receptacle is permitted to flow through the conduit B. The water, preferably having been first warmed, as in the preliminary-heating coil $b^5$, is, upon its entrance into the said conduit B, immediately divided into small quantities or masses by the non-combustible heat-conducting material within and in its divided condition quickly turned into a gaseous condition or steam, the steam thus generated in its further passage through the remaining portion of the said conduit being highly superheated, arriving at the outlet end of said conduit in a perfectly dry condition, a portion of the steam thus generated being conducted through the pipe $b^6$ to the inlet $a$ of the conduit A to enter the latter conduit with the hydrocarbon and act as a carrier or means to force the gas generated from the hydrocarbon through the said conduit more rapidly, and also to supply the gas generated from the hydrocarbon with such amount of hydrogen as will greatly intensify the heating properties of the gas when subsequently utilized in the burner D or otherwise. The remaining portion of the steam is conducted through the pipe $e^4$ to the jet device or burner $e^3$ at the side and near the bottom of the cupola E, the steam conducted through the pipe $e^4$ being more or less mixed with gas admitted to said pipe through the branch $a^9$ by opening the valve $a^{10}$, the gas at such time preferably predominating, so that it may be ignited at the jet device $e^3$ and effect combustion of the coal or carbon within the cupola. After the carbon in the cupola has reached an incandescent state the gas supplied through the branch $a^9$ may be reduced, the highly-heated steam from the conduit B, by reason of the oxygen and hydrogen which it supplies, being in itself almost sufficient to maintain the carbon in an incandescent state. If from any cause the temperature within the cupola should fall and the carbon drop below the incandescent state, the valve $a^{10}$ is opened wider for a time to supply sufficient gas to the jet device $e^3$ to effect a new combustion of the carbon within the cupola, when the said gas may be again reduced.

The excessively rich gas not used at the burner D is preferably conducted through the pipe $a^8$ to the cupola E, where it is thoroughly mingled with the gases issuing from the incandescent carbon and reduced thereby to an excellent illuminating or heating commercial gas.

The mixed or reduced gas from the cupola E in the apparatus herein selected to illustrate this invention is conducted from the cupola through a suitable outlet-pipe $f$ to a washing device or scrubber $g$ of any suitable construction, and subsequently through suitable usual devices (not shown) by which the impurities in the gas are removed, the purified gas being conducted to the usual receiver. (Not shown.)

The opening $e^2$ at the bottom of the cupola and herein shown as controlled by the register $e^7$ furnishes means for adjustment of the quantity of air permitted to enter the cupola, and $e^8$ at the top of the cupola represents an exit-opening for the products of combustion, this latter opening being also controlled by a damper, as $e^9$, which may be closed or opened, as occasion may require.

It will be seen that I employ a portion of the gas generated to maintain the conduits in a highly-heated condition, thus dispensing with the usual expensive heating plants heretofore required to generate the gas and steam. I am enabled to do this principally by the use of the conduit filled more or less with the non-combustible heat-conducting material. By the use of this peculiar conduit an enormous heating-surface is presented, which readily and quickly raises the temperature of the divided fluid to a high degree and with the expenditure of only a relatively small amount of heat at the burner, so I am enabled to draw off from the gas generated a sufficiently small supply to maintain these conduits in a highly-heated condition without lessening the efficiency of the apparatus for supplying gas. It will be seen that this effects a very great saving in the cost of running the apparatus and manufacturing the gas. Again, I further increase the intensity of the heat produced at the burner D by the use of steam, which supplies oxygen and hydrogen, the former assisting in combustion and the latter greatly intensifying the heat. I further economize by using steam to maintain the carbon in the cupola E in an incandescent state, using only such gas at times as is necessary to renew the combustion, the gases generated from this incandescent carbon being sufficient to reduce the otherwise excessively rich gas supplied through the pipe $a^8$, thereby producing an excellent commercial gas of high illuminating power.

This invention is not restricted to the particular apparatus herein selected and shown to illustrate the invention, for the same may be varied without departing from the spirit and scope of the invention.

Without limiting myself as to details, what I claim, and desire to secure by Letters Patent, is—

1. In an apparatus for the manufacture of gas, a gas-conduit through which a hydrocarbon is passed; a water-conduit through which water is passed to generate steam; a gas-burner for and to heat said conduits, and supplied with gas from the said gas-conduit; an air-mixing device between said gas conduit and burner whereby air and gas pass to the burner together; connections between the outlet of said steam-conduit and the inlet of said gas-conduit; a cupola containing carbon through which gas from the gas-conduit is caused to pass; a steam-jet device to supply steam to said cupola; connections between the gas-conduit and said steam-jet device whereby gas or steam or both may be injected toward said carbon from said jet device; and valves for and to regulate the flow of gas and steam to their several connections, substantially as described.

2. In an apparatus for the manufacture of gas, a gas-conduit, through which a hydrocarbon is passed; and an outlet-pipe from said conduit; a water-conduit through which water is passed to generate steam; a gas-burner for and to heat the said conduits and supplied with gas from the first-named or gas-conduit; an air and gas mixing device between said gas conduit and burner, whereby air and gas pass to the burner together; a cupola containing carbon; a steam-jet device connected with said gas-conduit to supply steam and gas to the said cupola, the steam so supplied being decomposed by the incandescent carbon; and connections between the said cupola and the outlet-pipe for the gas-conduit whereby the decomposed elements of the steam, together with gases arising from the incandescent carbon may be mixed with the gas issuing from the said gas-conduit, substantially as described.

In testimony whereof I have signed my name to this specification in the presence of two subscribing witnesses.

GEORGE H. GREGORY.

Witnesses:
CHAS. A. PHELPS,
FREDERICK L. EMERY.